US011860041B2

(12) United States Patent
Champavere

(10) Patent No.: US 11,860,041 B2
(45) Date of Patent: Jan. 2, 2024

(54) DUAL WAVELENGTH DISTRIBUTED TEMPERATURE SENSING WITH BUILT-IN FIBER INTEGRITY MONITORING

(71) Applicant: VIAVI SOLUTIONS INC., San Jose, CA (US)

(72) Inventor: Andre Champavere, Saint-Bonnet les Oules (FR)

(73) Assignee: VIAVI SOLUTIONS INC., Chandler, AZ (US)

( * ) Notice: Subject to any disclaimer, the term of this patent is extended or adjusted under 35 U.S.C. 154(b) by 14 days.

(21) Appl. No.: 17/566,361

(22) Filed: Dec. 30, 2021

(65) Prior Publication Data
US 2022/0120622 A1 Apr. 21, 2022

Related U.S. Application Data

(62) Division of application No. 16/119,807, filed on Aug. 31, 2018, now Pat. No. 11,280,687.

(30) Foreign Application Priority Data

Aug. 1, 2018 (FR) ........................ 1857219

(51) Int. Cl.
*G01K 11/3206* (2021.01)
*G01D 5/353* (2006.01)
(Continued)

(52) U.S. Cl.
CPC ..... *G01K 11/3206* (2013.01); *G01D 5/35361* (2013.01); *G01D 5/35364* (2013.01);
(Continued)

(58) Field of Classification Search
CPC ........ G01K 11/3206; G01K 1/00; G01K 3/14; G01K 11/324; G01D 5/35361; G01D 5/35364; H01S 3/23; H01S 3/2391
See application file for complete search history.

(56) References Cited

U.S. PATENT DOCUMENTS 5,069,544 A * 12/1991 Buerli ................ G01M 11/3145
356/73.1
5,113,277 A * 5/1992 Ozawa ................... G01K 11/32
374/E11.015
(Continued)

FOREIGN PATENT DOCUMENTS

| CN | 201417140 Y | 3/2010 |
| EP | 0225023 B1 | 10/1991 |
| WO | 2009/011766 A1 | 1/2009 |

OTHER PUBLICATIONS

John A. Jay, "An Overview of Macrobending and Microbending of Optical Fibers", Corning, New York, Dec. 2010, 21 pages. https://www.corning.com/media/worldwide/coc/documents/Fiber/RC-%20White%20Papers/WP-General/WP1212_12-10.pdf.
(Continued)

*Primary Examiner* — Nathaniel T Woodward
*Assistant Examiner* — Philip L Cotey
(74) *Attorney, Agent, or Firm* — Mannava & Kang, P.C.

(57) ABSTRACT

In some examples, a temperature distribution sensor may include a laser source to emit a laser beam that is tunable to a first wavelength and a second wavelength for injection into a device under test (DUT). A first wavelength optical receiver may convert a return signal corresponding to the first wavelength with respect to Rayleigh backscatter or Raman backscatter Anti-Stokes. A second wavelength optical receiver may convert the return signal corresponding to the second wavelength with respect to Rayleigh backscatter or Raman backscatter Stokes. Bending loss associated with the DUT may be determined by utilizing the Rayleigh backscatter signal corresponding to the first wavelength and the Rayleigh backscatter signal corresponding to the second wavelength. Further, temperature distribution associated with the DUT may be determined by utilizing the Raman backscatter Anti-Stokes signal corresponding to the first
(Continued)

wavelength and the Raman backscatter Stokes signal corresponding to the second wavelength.

10 Claims, 15 Drawing Sheets

(51) Int. Cl.
    *G01K 1/00*     (2006.01)
    *G01K 3/14*     (2006.01)
    *G01K 11/324*     (2021.01)
    *H01S 3/23*     (2006.01)

(52) U.S. Cl.
    CPC ............... *G01K 1/00* (2013.01); *G01K 3/14* (2013.01); *G01K 11/324* (2021.01); *H01S 3/23* (2013.01); *H01S 3/2391* (2013.01)

(56) References Cited

U.S. PATENT DOCUMENTS

| | | | |
|---|---|---|---|
| 5,146,521 A * | 9/1992 | Hartog | G01M 11/33 250/231.19 |
| 5,757,487 A * | 5/1998 | Kersey | G01D 5/35383 356/478 |
| 5,765,948 A * | 6/1998 | Sai | G01K 11/32 374/161 |
| 6,285,446 B1 * | 9/2001 | Farhadiroushan | G01D 5/35383 356/450 |
| 8,520,196 B2 * | 8/2013 | Hirai | H04B 10/071 356/73.1 |
| 9,157,811 B2 * | 10/2015 | Zhang | G01K 11/32 |
| 2006/0210269 A1 * | 9/2006 | Farhadiroushan | G01D 5/35364 374/E11.015 |
| 2007/0223556 A1 * | 9/2007 | Lee | G01K 15/00 374/161 |
| 2010/0128756 A1 * | 5/2010 | Lee | G01K 15/005 374/161 |
| 2011/0231135 A1 * | 9/2011 | Suh | G01K 11/32 374/1 |
| 2012/0224168 A1 * | 9/2012 | Hirai | H04B 10/071 356/73.1 |
| 2013/0021598 A1 * | 1/2013 | Komamaki | G01M 11/3136 356/73.1 |
| 2013/0028289 A1 * | 1/2013 | Zhang | G01K 11/32 374/161 |
| 2013/0028555 A1 * | 1/2013 | Dailey | G01D 5/35316 385/12 |
| 2015/0233767 A1 * | 8/2015 | Cedilnik | G01K 11/32 250/341.1 |
| 2015/0300891 A1 * | 10/2015 | Mitchell | G01K 11/32 356/73.1 |
| 2016/0258743 A1 * | 9/2016 | Yao | G01L 1/242 |
| 2017/0176221 A1 * | 6/2017 | Hartog | G01D 5/35361 |
| 2017/0199088 A1 * | 7/2017 | Therrien | G01K 11/32 |
| 2017/0350735 A1 * | 12/2017 | Cheng | G01D 5/35329 |
| 2018/0073959 A1 * | 3/2018 | Lecoeuche | G01D 5/35361 |
| 2018/0143041 A1 * | 5/2018 | Johnston | E21B 47/135 |
| 2018/0143085 A1 * | 5/2018 | Uno | G01K 11/32 |
| 2018/0195856 A1 * | 7/2018 | Reaves | G01B 11/16 |
| 2018/0223647 A1 * | 8/2018 | Johnston | E21B 47/113 |
| 2021/0190550 A1 * | 6/2021 | Handerek | G01D 5/35364 |

OTHER PUBLICATIONS

Viavi, "Macrobend Detection Using an OTDR", 2015, 4 pages. https://www.viavisolutions.com/de-de/literature/macrobend-detection-using-otdr-white-paper-en.pdf.

* cited by examiner

DUAL WAVELENGTH DISTRIBUTED TEMPERATURE SENSING WITH BUILT-IN FIBER INTEGRITY MONITORING

PRIORITY

This application is a Divisional Application of U.S. application Ser. No. 16/119,807, filed Aug. 31, 2018, which claims priority under 35 U.S.C. 119(a)-(d) to French patent application number 1857219, having a filing date of Aug. 1, 2018, the disclosures of which are hereby incorporated by reference in their entireties.

BACKGROUND

Distributed temperature sensing may be described as the measurement of temperature by using optical fibers. In distributed temperature sensing, an optical fiber may function as a sensor. A distributed temperature sensing system may provide temperature measurements at specified distances along the length of the optical fiber. For example, the specified distances may include a spatial resolution of one meter. The temperature measurements may be made to a specified accuracy (e.g., ±0.5° C.).

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
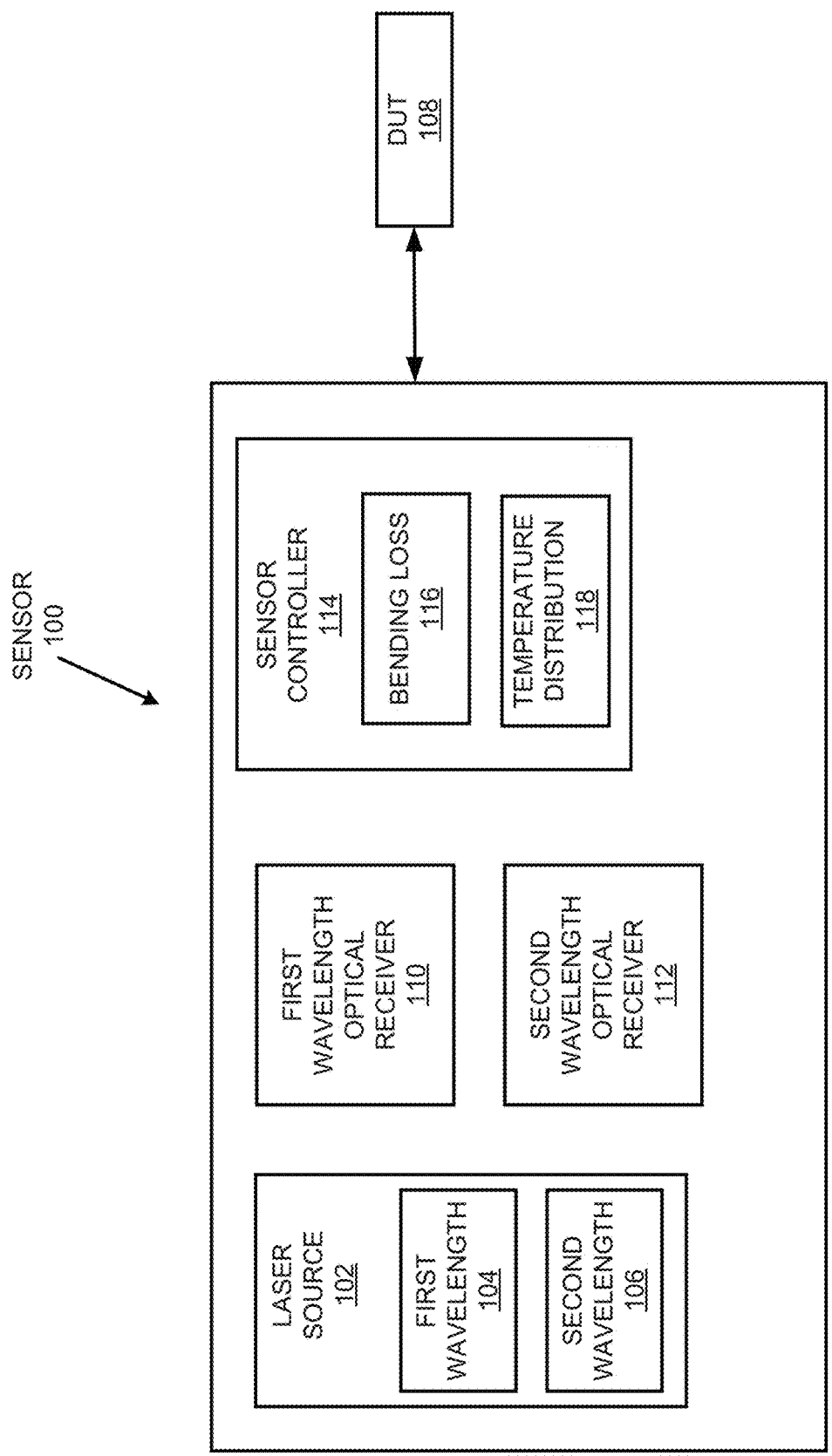
FIG. 1 illustrates an architecture of a temperature distribution sensor, according to an example of the present disclosure.

For simplicity and illustrative purposes, the present disclosure is described by referring mainly to examples thereof. In the following description, details are set forth in order to provide an understanding of the present disclosure. It will be readily apparent however, that the present disclosure may be practiced without limitation to these details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Distributed temperature sensors, and methods for distributed temperature sensing are disclosed herein. The sensors and methods disclosed herein may provide distributed temperature sensing (DTS) using dual wavelength sources, and combining four backscatter measurements that may include two pairs of Rayleigh and Raman backscattering signals to detect wavelength sensitive loss events such as macro bending losses that may have been wrongfully identified as a temperature offset, as well as other wavelength sensitive losses that may impact measurements or the fiber integrity.

With respect to distributed temperature sensing, an optical time-domain reflectometer (OTDR) is an optoelectronic instrument used to characterize an optical fiber. The OTDR may inject a series of optical pulses into an optical fiber under test. Based on the injected optical pulses, the OTDR may extract, from the same end of the optical fiber in which the optical pulses are injected, light that is scattered or reflected back from points along the optical fiber. The scattered or reflected light that is gathered back may be used to characterize the optical fiber. For example, the scattered or reflected light that is gathered back may be used to detect, locate, and measure events at any location of the optical fiber. The events may include faults at any location of the optical fiber. Other types of features that may be measured by the OTDR principle may include temperature distribution along a fiber, attenuation uniformity and attenuation rate, segment length, and location and insertion loss of connectors, splices, or any other optical components such as splitters or multiplexers.

With respect to temperature distribution measurement by an OTDR, an OTDR may include distributed temperature sensing. For distributed temperature sensing, Raman distributed temperature sensing may encounter different attenuations at different test wavelengths. For example, the different test wavelengths may include the Anti-Stokes (AS) wavelength, the Rayleigh wavelength, the Stokes wavelength, etc. In order to implement distributed temperature sensing, interrogation of an optical fiber may be performed by using several laser sources. Alternatively or additionally, the interrogation of the optical fiber may be dual-ended (e.g., on both ends of the optical fiber). For an interrogation that includes several laser sources, the distributed temperature sensing results may include inconsistencies in that differing spectral shapes of the various test signals used may result in different mean-weighted-average wavelengths and non-matching attenuation compensations. For an interrogation that is dual-ended, the need to access both ends of an optical fiber may add additional technical complexities, for example, with respect to a downhole end of the optical fiber.

Figure 3:
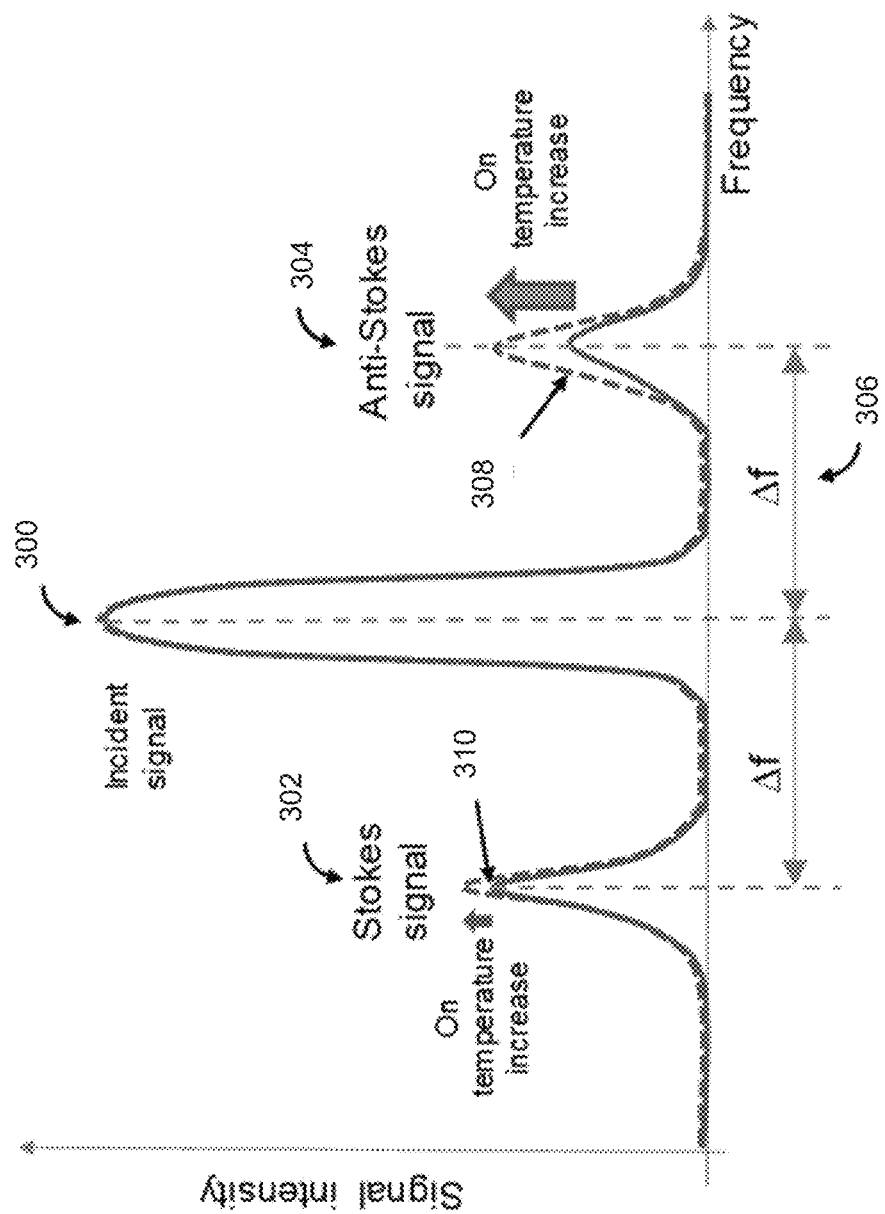
FIG. 3 illustrates Stokes and Anti-Stokes signals, according to an example of the present disclosure.

Roman scattering base distributed temperature sensing systems (R-DTS) may use optical reflectometry techniques to measure temperature all along an optical fiber or optical cable. In this regard, FIG. 3 illustrates Stokes and Anti-Stokes signals. When an optical fiber is stimulated by a primary optical signal 300, a nonlinear phenomenon called Raman scattering may occur generated on both sides of the stimulus frequency, with two additional optical signals being denoted including Stokes 302 and Anti-Stokes 304. The Stokes signal may be created at a low frequency while the Anti-Stokes signal may be generated at high frequency. The frequency separation from the primary optical stimulus may be denoted the Raman frequency shift 306. For telecom optical fibers, the Raman frequency shift may be approximately 13.2 THz. The intensity of the Anti-Stokes signal may be temperature dependent as shown at 308, while the Stokes intensity may have less dependency on fiber temperature as shown at 310.

The temperature distribution sensor may compare the Raman Anti-Stokes and Stokes signals to obtain access to the distributed temperature along the fiber under test. In this regard, the local temperature may be derived from the ratio of the anti-Stokes $I_S$ and Stokes intensities $I_{AS}$ as follows:

$$\frac{I_S}{I_{AS}} = R_{(T)} = I_S \cdot \left(\frac{\lambda_S}{\lambda_{AS}}\right)^4 \cdot e^{\left(-\frac{h\Delta f}{k_B T}\right)} \quad \text{Equation (1)}$$

$I_S$ = Stokes Intensity $I_{AS}$ = Anti-Stokes Intensity $\lambda_S$ = Stokes wavelength $\lambda_{AS}$ = Anti-Stokes wavelength $h$ = Plank constant = $6.62606957 \times 10 - 34$ m2 kg/s $\Delta f$ = frequency seperation between Stokes/Anti- Stokes frequency and Rayleigh light frequency $k_B$ = Boltzamm constant =

$1.3806488 \times 10 - 23$ m2 kg s $-2K - 1$

Figure 4A:
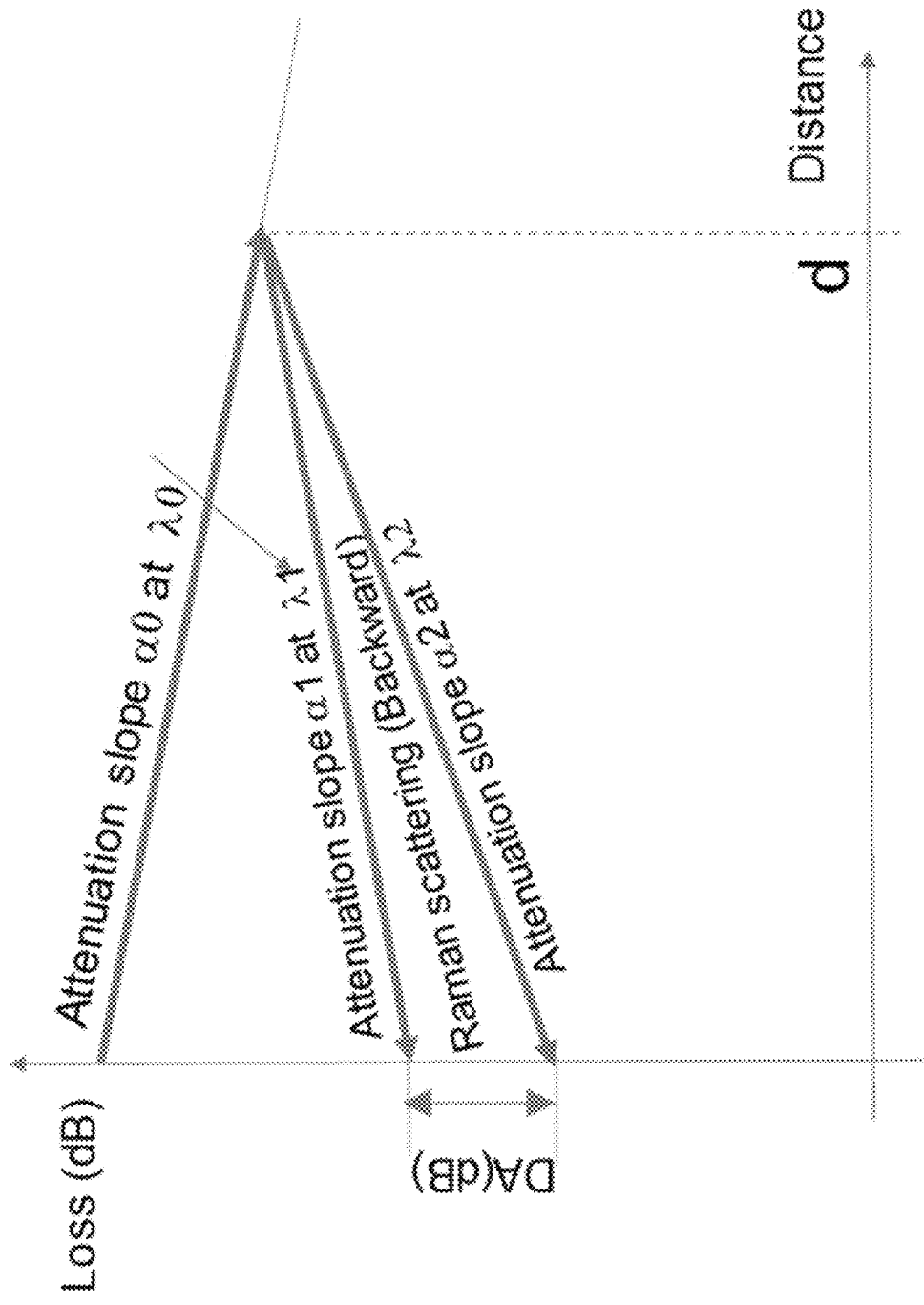
FIG. 4A illustrates differential attenuation according to an example of the present disclosure.
Figure 4B:
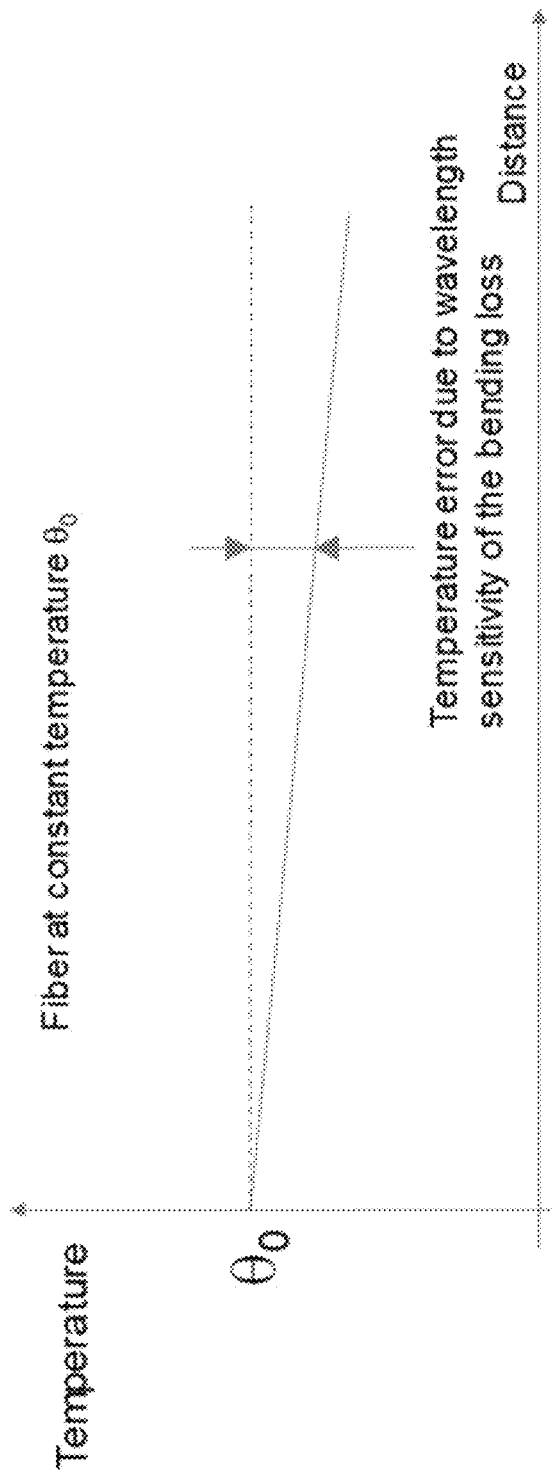
FIG. 4B illustrates temperature error due to wavelength sensitivity of bending loss according to an example of the present disclosure.

Equation (1) may be valid if the Stokes and Anti-Stokes signals are actually measured at the distance where the temperature is expected to be measured. In this regard, the optical signals may be attenuated according to the fiber attenuation loss between the source and the distance where the temperature has to be measured. Due to the wavelength dependency of optical fiber, the attenuation for the Anti-Stokes and Stokes may be different, which may impact the relative amplitude of Stokes and Anti-Stokes signal. This differential attenuation between the Stokes and Anti-Stokes signal along the optical path may cause temperature measurement errors. If not compensated, this differential attenuation may generate a temperature offset that increases with distance (e.g., see FIG. 4A). Further, FIG. 4B illustrates temperature error due to wavelength sensitivity of bending loss according to an example of the present disclosure.

Considering loss versus distance at two different wavelengths, λ1 for the Stokes wavelength and λ2 for the Anti-Stokes wavelength, even with a fiber maintained at a constant temperature, as the fiber attenuation depends on the wavelength, the differential attenuation may impact the Raman backscatter signals and the ratio between Raman Stokes and Anti-Stokes. As an example, considering λ1 and λ2 as respectively the attenuation coefficients of a fiber at λ1 and λ2, the differential attenuation may create an offset (λ1–λ2) multiplied by the distance. For λ1=0.21 dB/km and λ2=0.19 dB/km, the differential attenuation may represent 0.2 dB on the return signal at 10 km from the beginning of the fiber and impact by 0.1 dB the difference between the Stokes and Anti-Stokes measured on the distributed temperature sensing trace. On a single mode fiber at approximately 1550 nm, the 0.1 dB differential attenuation may translate in more than 6° C. temperature error. For differential attenuation increasing with distance, the corresponding temperature offset may also increase with distance.

Figure 5A:
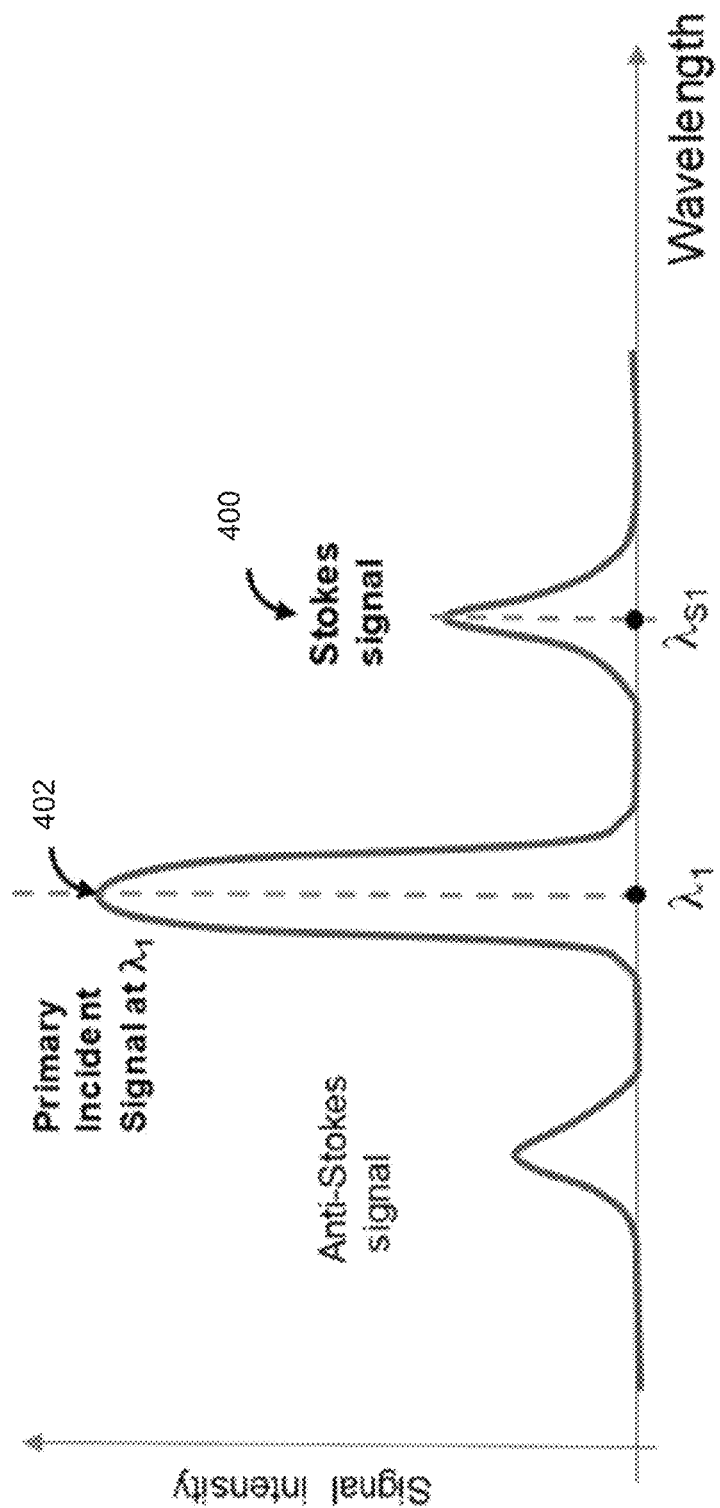
FIGS. 5A and 5B illustrate examples of wavelengths where dual wavelength Raman scattering base distributed temperature sensing systems (R-DTS) may launch a primary signal at wavelength $\lambda_1$ and a second signal at wavelength $\lambda_2$ separated by the fiber Raman shift $\Delta RS$, according to an example of the present disclosure.
Figure 5B:
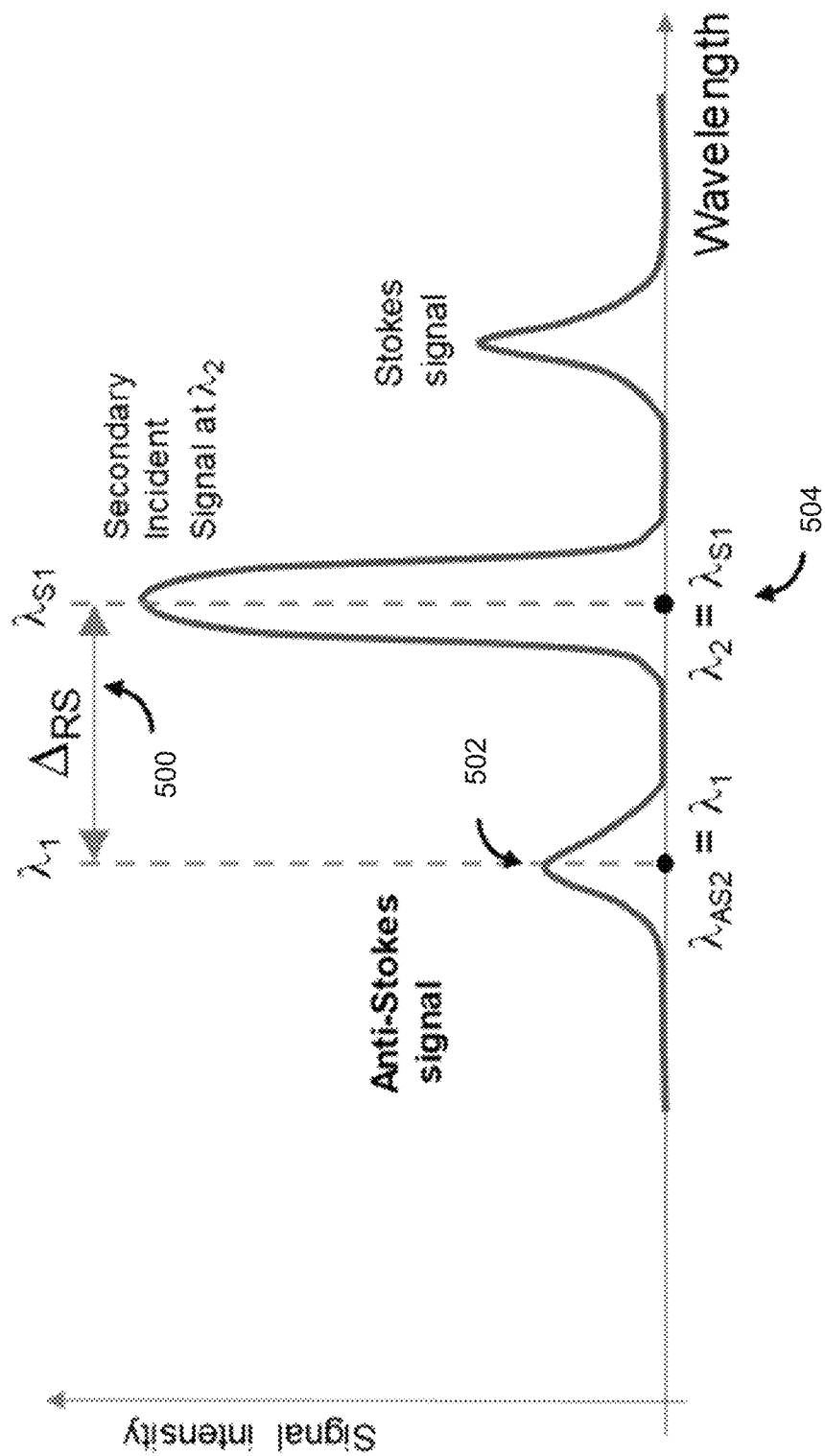

In order to correct the potential errors due to differential attenuation occurring in a fiber optic temperature measurement system, input pulses of light may be launched at two different wavelengths $\lambda_1$ and $\lambda_2$ with relative optical frequencies aligned on the Raman shift to compensate the differential attenuation. In this regard, FIGS. 5A and 5B illustrate examples of wavelengths where the dual wavelength R-DTS may launch a primary signal at wavelength $\lambda_1$ and a second signal at wavelength $\lambda_2$ separated by the fiber Raman shift ΔRS at 500 (e.g., see FIG. 5B). The local temperature may be derived from the ratio of the Stokes intensity at wavelength $\lambda_{S1}$ at 400 (e.g., see FIG. 5A) of the primary source 402 and the Anti-Stokes intensities at wavelength $\lambda_{AS2}$ at 502 of the secondary source 504. For both Stokes and Anti-Stokes signals, the fiber attenuation along the optical path may be determined as the sum of attenuation at wavelength $\lambda_1$ in one direction and the attenuation at wavelength $\lambda_2$ in the other direction, and thus, may be equally affected by the attenuation of the fiber.

Figure 6A:
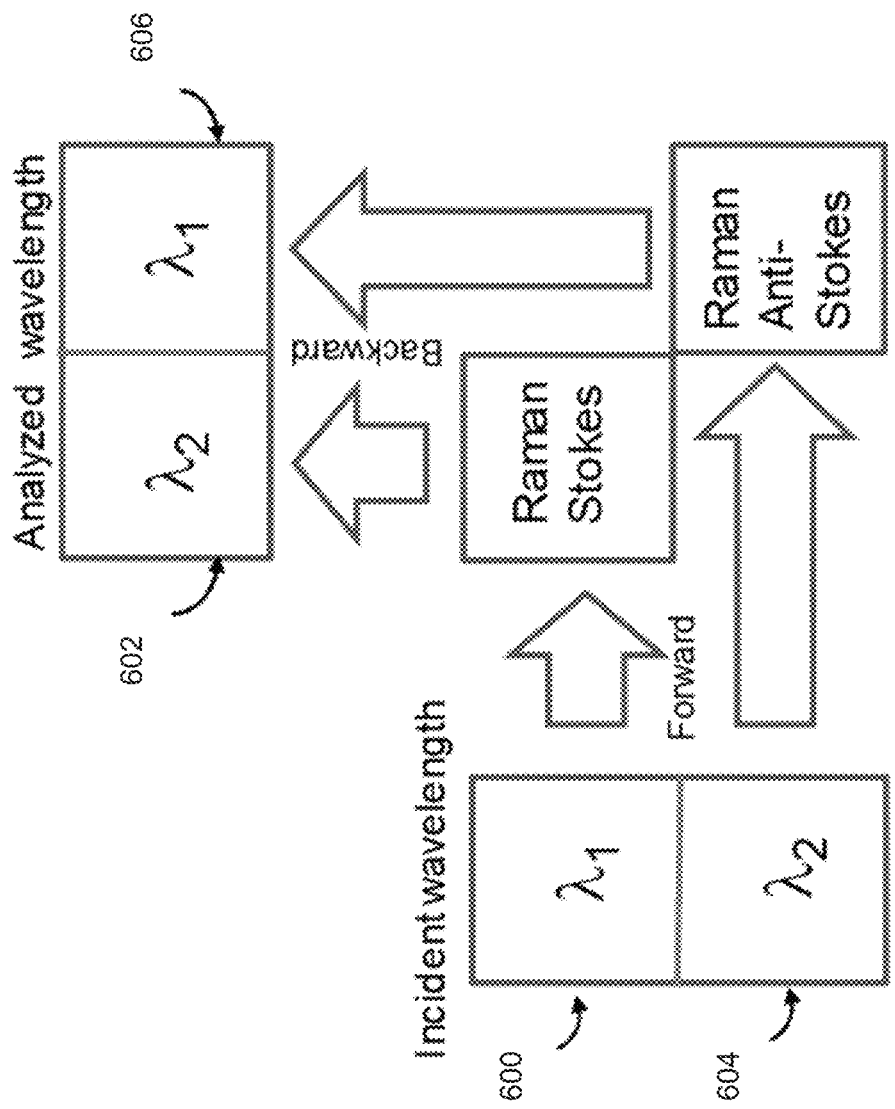
FIG. 6A illustrates an example of the measurement principle of dual wavelength R-DTS where the incident signals at one wavelength may be combined with a Raman backscatter signal at the other wavelength (e.g., $\lambda_1$ then $\lambda_2$, or $\lambda_2$ then $\lambda_1$), according to an example of the present disclosure.
Figure 6B:
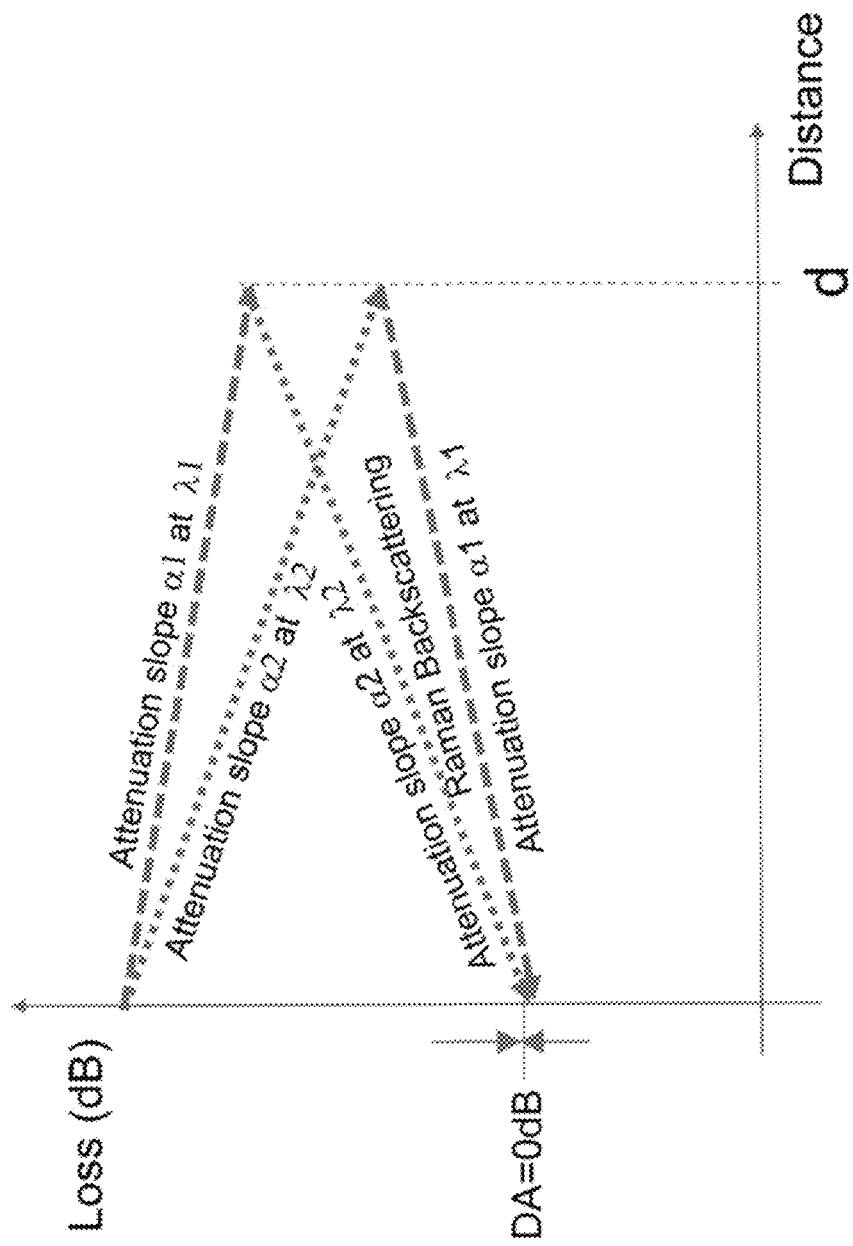
FIG. 6B illustrates various attenuation slopes according to an example of the present disclosure.

Referring to FIG. 6A that illustrates an example of the measurement principle of dual wavelength R-DTS where the incident signals at one wavelength may be combined with a Raman backscatter signal at the other wavelength (e.g., $\lambda_1$ then $\lambda_2$, or $\lambda_2$ then $\lambda_1$), the incident forward signal 600 at $\lambda_1$ may generate the Raman Stokes backward signal 602 at $\lambda_2$. The incident forward signal 604 at $\lambda_2$ may generate the Raman Anti-Stokes backward signal 606 at $\lambda_1$. In both cases, the signal received by the temperature distribution sensor may be a directional signal combining attenuation of these wavelengths. Further, referring to FIG. 6B, the dual wavelength technique either based of two different sources or one tunable source may provide for compensation of the differential attenuation all along a fiber. In this regard, irrespective of the distance, the two way attenuation may remain the same.

With respect to fiber bending, certain optical losses occurring at a specific location or over a relatively short distance, such as bend losses, may be wavelength sensitive. When a multimode or a single mode fiber is bent, under a certain bend radius, some of the guided light may be refracted out of the fiber. Macro bending of an optical fiber may be described as the attenuation associated with bending or wrapping of the fiber. In this regard, light may "leak out" of a fiber when the fiber is bent. Further, as the bend becomes more acute, more light may leak out. For a given optical fiber, the attenuation increase may depend on factors such as the radius of the bend, the number of bends (or length under bend), the wavelength of the signal, etc.

Figure 7:
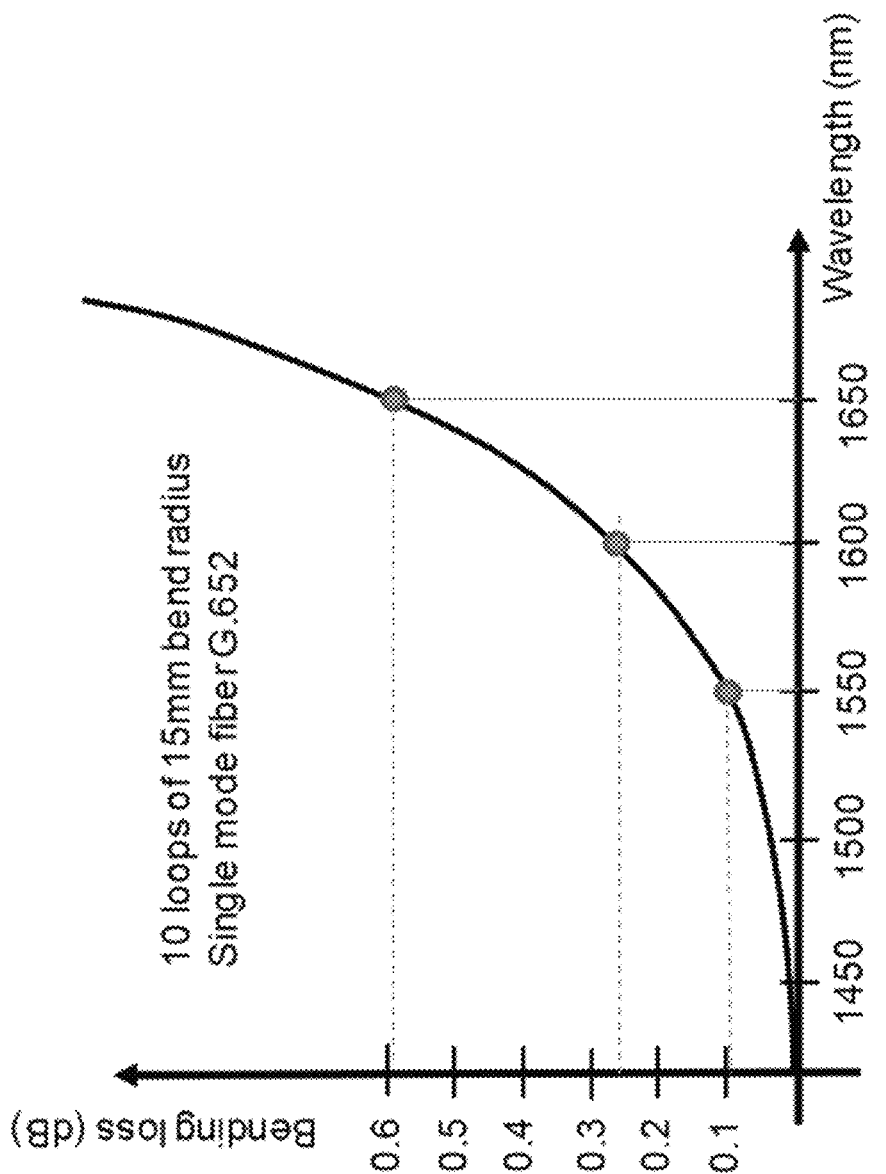
FIG. 7 illustrates a typical variation of bending loss versus bend diameters for two different wavelengths, according to an example of the present disclosure.
Figure 8:
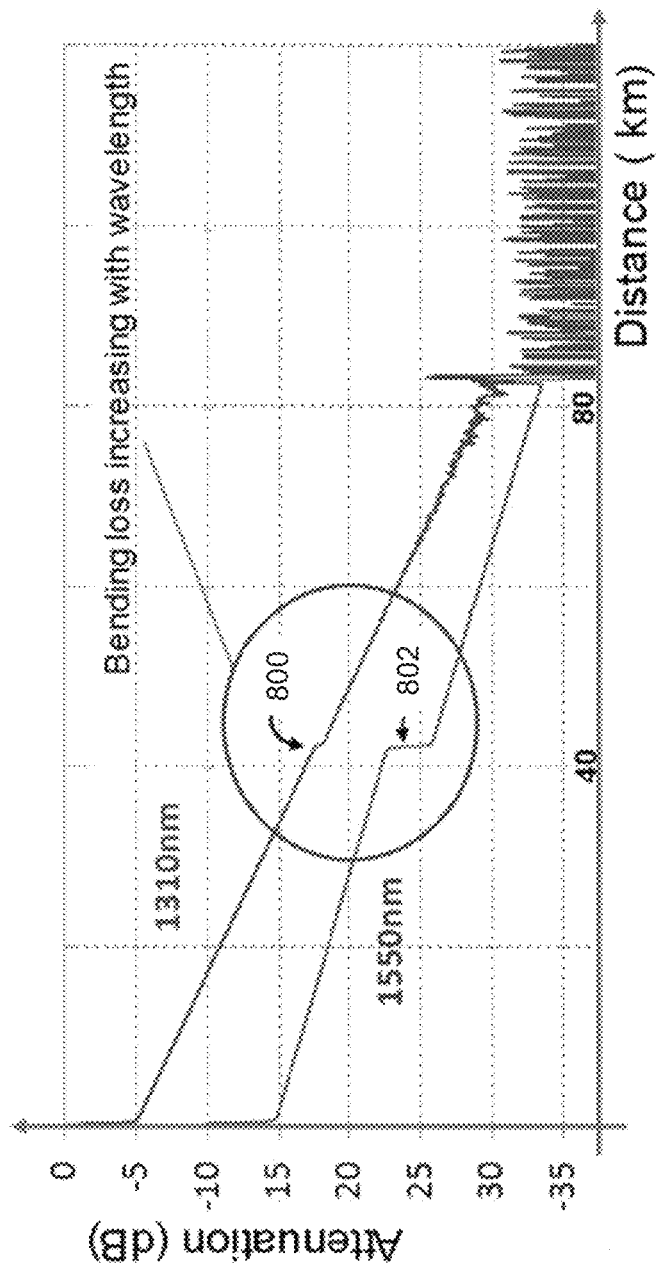
FIG. 8 illustrates an example of a variation of bending loss for two different wavelengths, according to an example of the present disclosure.

The wavelength sensitive attenuation of optical fibers bending may be differentiated relative to normal (e.g., non-bent) operations. In this regard, the fiber attenuation may be defined in normal conditions at different wavelengths, and the attenuation in bend conditions may be defined at different wavelengths, on different bend diameters, and numbers of turns of the fiber wrapped around a mandrel of a specified diameter. For example, when the 1550 nm wavelength was first introduced and added to the 1310 nm transmission wavelength, the bending effect was analyzed. In this regard, FIG. 7 illustrates a typical variation of bending loss versus bend diameters for two different wavelengths (e.g., wavelength dependency of the bending loss for a same bending condition). Micro bending may be described as an attenuation increase caused by high frequency longitudinal perturbations to the waveguide. The micro bending may include less wavelength dependency compared to macro bending, FIG. 8 illustrates an example of a variation of bending loss for two different wavelengths. In this regard, FIG. 8 illustrates the wavelength dependency of the bending loss for a same bending condition. Two different measurements are illustrated at 800 and 802, and show bending loss increase with wavelength.

At a defined wavelength, the bending losses may appear under a certain bend radius then increase rapidly when increasing wavelength. For example, on a G.652 single mode fiber, a 0.6 dB bending loss at 1550 nm may more than double when measured as 1625 nm.

With respect to bending losses and distributed temperature measurements, DTS measurement errors due to differential attenuation may be amplified at a bend location due to the wavelength dependency of bend loss. Bending losses wavelength sensitivity may accentuate the problem of differential attenuation of a single ended single source DTS. Even if the differential attenuation is correctly compensated using the self-calibrated technique, and if the bend does not impact the temperature measurement, a fiber bending loss of even a few tenths of dB may indicate the presence of a bend of the sensing fiber. Detecting and locating the fiber bends or another wavelength sensitive loss event may be beneficial for distributed temperature sensing applications. The presence of a bending loss may indicate the existence of a mechanical stress on the fiber, a spot or area of weakness that may impact the integrity, the stability, and/or the reliability of the temperature distribution sensor. Moreover, as the loss may be strongly dependent on the bending radius, a slight decrease of the bend radius may impact operation of the temperature distribution sensor, and a larger decrease may even shut down the monitoring on the fiber section following the bend location.

When the differential attenuation of a fiber is correctly compensated, a constant temperature may be translated on the R-DTS temperature trace as a horizontal line, whereas not compensated bending losses may appear as temperature offsets. In the presence of a high insertion loss wavelength sensitive event, the correction of the differential attenuation based on the fiber attenuation is still very efficient and may not completely compensate the differential attenuation of the bending losses. Multiple parameters may affect the compensation of differential attenuation of a fiber bend. For example, the different optical signals that take part of temperature measurements may not be monochromatic. The spectral characteristic of the R-DTS light sources, and the spectral shape of the Raman backscattering and of the corresponding Raman optical filters may represent parameters that contribute to this phenomenon. As an example, the spectral content of these signals may not be equally affected by the bend. A bend may also impact a mode field of a single mode fiber, as well as modal distribution of a multimode fiber. The associated distortion may make the fiber differential attenuation correction inappropriate, thus creating a virtual temperature offset on the temperature trace that is indistinguishable from real temperature steps.

With respect to correction of potential errors due the bending losses or other local wavelength sensitive insertion due to a specific differential attenuation, a Raman scattering signal may be used to detect and locate fiber bends. In this regards, a Stokes signal may be used to detect and locate bends. Even if the Stokes signal is more sensitive to bending losses compared to Anti-Stokes due to the higher wavelength, and is also less temperature sensitive compared to the Anti-Signal signal, the Stokes signal is still temperature sensitive. The Raman Stokes signal may include a low backscattering level compared to Rayleigh backscattering, which may lead to low signal to noise, which may lead to a limited distance range or poor localization accuracy. For example, on a single mode fiber, the Raman backscattering coefficient may be 24 dB lower than the Rayleigh backscattering coefficient. Thus, using the Stokes signal for detecting bend may face dynamic range issues that may impact the distance resolution and/or the localization accuracy depending of the dynamic versus resolution compromise.

In order address the aforementioned technical challenges related, for example, to distributed temperature measurement in the presence of undetected wavelength sensitive losses such as fiber bend losses, the temperature distribution sensor as disclosed herein may identify and locate, on the temperature trace, the offsets due to a wavelength sensitive loss-event that is wrongfully identified as a temperature offset by combining four backscatter measurements, which may include two pairs of a dual wavelength Rayleigh and Raman measurements. The four backscatter measurements may combine distributed loss measurement using Rayleigh backscattering to detect bends and distributed temperature measurement using Raman Backscattering. For example, as the wavelengths $\lambda 1$ and $\lambda 2$ of the two Rayleigh backscattering signals are different because of the separation by a Raman Shift, bend loss may be detected by comparing the insertion loss of events at these two wavelengths. As the two wavelengths $\lambda 1$ and $\lambda 2$ launched in the fiber respectively generate Stokes at $\lambda 2$ and Anti-Stokes at $\lambda 1$, the distributed temperature measurement may be performed using the Stokes and Anti-Stokes amplitudes. Further, the aforementioned false temperature events may be identified and marked on the temperature trace or/and in the results. Moreover, the virtual temperature offsets may be compensated in the measurement results and/or directly on the R-DTS trace.

According to examples disclosed herein, the temperature distribution sensor as disclosed herein may provide for fiber optic distributed temperature measurements with built-in identification and localization of false temperature offsets due to fiber bending loss by combining four measurements with two pairs of Rayleigh and Raman backscattering signal measurements.

According to examples disclosed herein, with respect to the temperature distribution sensor as disclosed herein, the false temperature offsets may be due to any highly wavelength sensitive loss-events in the fiber link. In this regard, the wavelength sensitive loss event may be detected, located, and corrected, for example, in the distributed temperature sensing data acquisition points or results table.

According to examples disclosed herein, with respect to the temperature distribution sensor as disclosed herein, the pair of Rayleigh and Raman Backscattering signals may be acquired sequentially using a single receiver.

According to examples disclosed herein, with respect to the temperature distribution sensor as disclosed herein, the wavelength sensitive loss event may be detected, located, and marked as a false temperature event on a temperature trace or in a result table.

According to examples disclosed herein, with respect to the temperature distribution sensor as disclosed herein, the wavelength sensitive loss event may be detected, located, and marked on a temperature result table.

According to examples disclosed herein, with respect to the temperature distribution sensor as disclosed herein, the wavelength sensitive loss event may be compensated by re-alignment of the displayed trace on both sides of the false temperature offset event.

According to examples disclosed herein, with respect to the temperature distribution sensor as disclosed herein, the wavelength sensitive loss of the local event may be compensated by applying locally a specific differential attenuation correction.

According to examples disclosed herein, with respect to the temperature distribution sensor as disclosed herein, the wavelength sensitive loss of the local event may be due to the physical degradation of the fiber or fiber cable integrity.

FIG. 1 illustrates an architecture of a temperature distribution sensor 100 (hereinafter referred to as "sensor 100"), according to an example of the present disclosure.

Referring to FIG. 1, the sensor 100, which may be an OTDR, may include a laser source 102 to emit a laser beam that is tunable to a first wavelength 104 (e.g., λ1) and a second wavelength 106 (e.g., λ2) for injection into a device under test (DUT) 108. Alternatively, two different laser sources may be used to respectively emit laser beams at the first wavelength 104 (e.g., λ1) and at the second wavelength 106 (e.g., λ2) for injection into the DUT 108. According to examples disclosed herein, the DUT 108 may be an optical fiber.

A first wavelength optical receiver 110 may convert a return signal corresponding to the first wavelength 104 with respect to Rayleigh backscatter or Raman backscatter Anti-Stokes.

A second wavelength optical receiver 112 may convert the return signal corresponding to the second wavelength 106 with respect to Rayleigh backscatter or Raman backscatter Stokes.

The sensor 100 may further include a sensor controller 114, which may include a processor, and a memory storing machine readable instructions that when executed by the processor cause the processor to determine bending loss 116 associated with the DUT 108 by utilizing the Rayleigh backscatter signal corresponding to the first wavelength 104 and the Rayleigh backscatter signal corresponding to the second wavelength 106.

The sensor controller 114 may further determine temperature distribution 118 associated with the DUT 108 by utilizing the Raman backscatter Anti-Stokes signal corresponding to the first wavelength 104 and the Raman backscatter Stokes signal corresponding to the second wavelength 106.

According to examples disclosed herein, the sensor controller 114 may identify, by combining measurements associated with the Rayleigh backscatter signal and the Raman backscatter Anti-Stokes signal analyzed at the first wavelength, and the Rayleigh backscatter signal and the Raman backscatter Stokes signal analyzed at the second wavelength, a false temperature offset related to an attribute of the DUT.

According to examples disclosed herein, the attribute of the DUT may include the bending loss associated with the DUT.

According to examples disclosed herein, the bending loss associated with the DUT may result in a wavelength sensitive loss-event in the DUT, and the sensor controller 114 may compensate for the wavelength sensitive loss-event in the DUT. For example, the sensor controller 114 may re-align an associated trace on both sides of the wavelength sensitive loss-event to compensate for the wavelength sensitive loss-event in the DUT. According to another example, the sensor controller 114 may perform local differential attenuation correction to compensate for the wavelength sensitive loss-event in the DUT.

Figure 2:
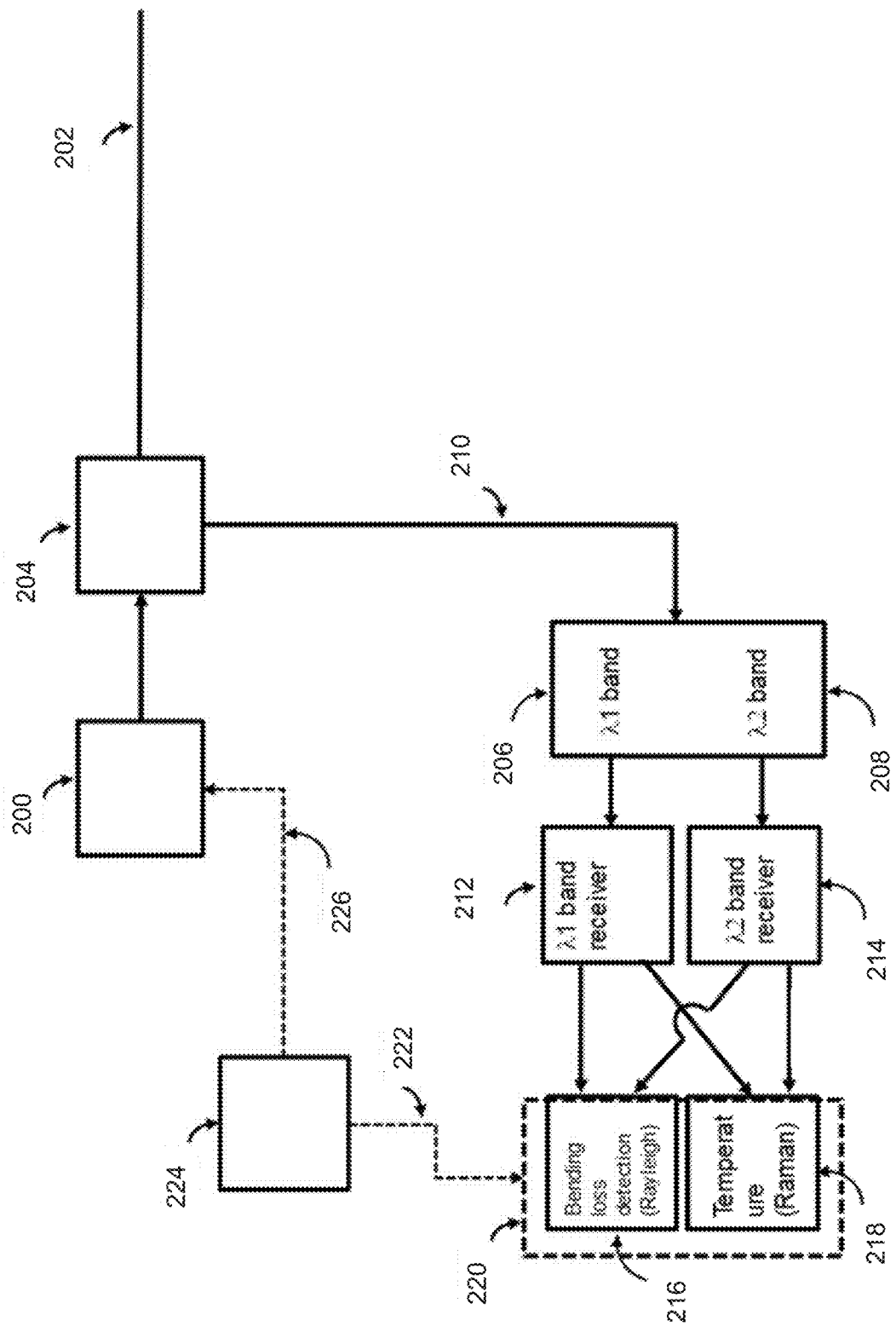
FIG. 2 illustrates an architecture of the temperature distribution sensor, according to another example of the present disclosure.

FIG. 2 that illustrates an architecture of the temperature distribution sensor, according to another example of the present disclosure.

Referring to FIG. 2, for the sensor 100, a dual wavelength signal source 200 may be coupled to the fiber optic under test 202 through an optical coupling device 204. The return signal may be coupled back by the optical coupling device 204 to the optical filtering device 206, 208 through connection 210. The signal at λ1 from Rayleigh and/or Raman Anti-Stokes may be converted by the optical receiver 212. The signal at λ2 from Rayleigh or Raman Stokes may then be converted by the optical receiver 214. The two Rayleigh signals at λ1 and λ2 may be processed in unit 216 to measure bend loss. An example of a process for bend loss identification may include comparing the insertion losses all along the fiber at these two wavelengths and identifying those that are wavelength sensitive, for example, by using a predefined threshold. For example, bending loss detection may be based on comparison of the amplitude of insertion loss of a same event at different wavelengths. For example, in FIG. 8, the same insertion loss measured at 1550 nm may be significantly higher than the insertion loss measured at 1310 nm indicating that this event on the traces corresponds to a bend because of the high wavelength sensitivity of its insertion loss. An example of a process for distributed temperature measurement may include using the Stokes and Anti-Stokes signals all along the fiber to determine the temperature versus distance. For example, the distributed temperature measurement may be based on analysis of the Stokes and Anti-Stokes signal amplitudes versus distance. For example, as described in FIG. 9, the incident signal at λ1 generates a Rayleigh backscatter at the same wavelength but also generates a Raman Stokes at 2 and in the same manner, the incident signal at λ2 generates a Rayleigh backscatter at the same wavelength but also generates an Anti-Stokes Signal at λ1.

The Raman Anti-Stokes at λ1 and the Raman Stokes at λ2 may be processed in unit 218 to measure distributed temperature. With respect to distributed temperature measurement, the Stokes and Anti-Stokes signals all along the fiber may be used to determine the temperature versus distance. The processing unit 220 may be connected by connection 222 to the control unit 224 that fulfils various features of a DTS, such as man machine interface, data storage, communication interfaces, etc.

The sensor 100 may be utilized for detecting and localizing incorrect temperature offsets that may be due to bend losses. Further, the sensor 100 may be utilized for any wavelength sensitive loss that translates in temperature errors. Generally, the four quadrants including the two Rayleigh backscatters may provide information on the fiber integrity, as well as for detecting and locating anomalies in the sensing fiber. Distributed temperature measurement performed on a fiber in relatively harsh environments may need monitoring of the fiber cable integrity that may be impacted by fiber macro or micro bends due to mechanical strain on the fiber cable. Moreover, monitoring Rayleigh traces in addition to temperature monitoring may detect the degradation of the optical components and connections, such as fiber splices and connectors, as well as degradation of the transmission properties of the fiber itself. Examples of physical degradation of the optical properties of a glass fiber may be seen in relatively harsh environments such as oil, gas, and other such applications where a fiber darkening phenomenon may impact the link budget due to the cracking of hydrocarbons in a well. Another example of a harsh environment may include fiber irradiation that may also impact the fiber loss and the differential attenuation correction along the irradiated fiber section. If unmonitored, these phenomena may distort the distributed temperature sensing readings, and may also lead to temperature measurement system shutdown.

Monitoring the fiber integrity with the Rayleigh traces while measuring temperature may be relevant to applications in harsh environments. As an example, where the fiber is exposed to ionized radiation effects or hydrogen darkening, the Rayleigh traces may be used to discriminate the different phenomena such as bending loss versus connection loss, or bending loss versus fiber attenuation increase due to darkening or radiative induced fiber loss. The Rayleigh traces may be used as disclosed herein before analyzing the wavelength sensitivity of insertion losses to locate bends. The bend detection may be relevant for R-DTS systems turn-up and commissioning to detect and remove fiber bending, for example, during operation to avoid false temperature alarms or guarantee the physical integrity of the sensing optical fiber.

Referring again to FIG. 2, the dual wavelength mode selection may be transmitted by connection 226 to the source 200, and to the Raman/Rayleigh processing unit 220 by connection 222.

The set-up of FIG. 2 may address the different possibilities to measure the Rayleigh and Raman backscatter, such as direct detection, pulse, or mod.

Figure 9:
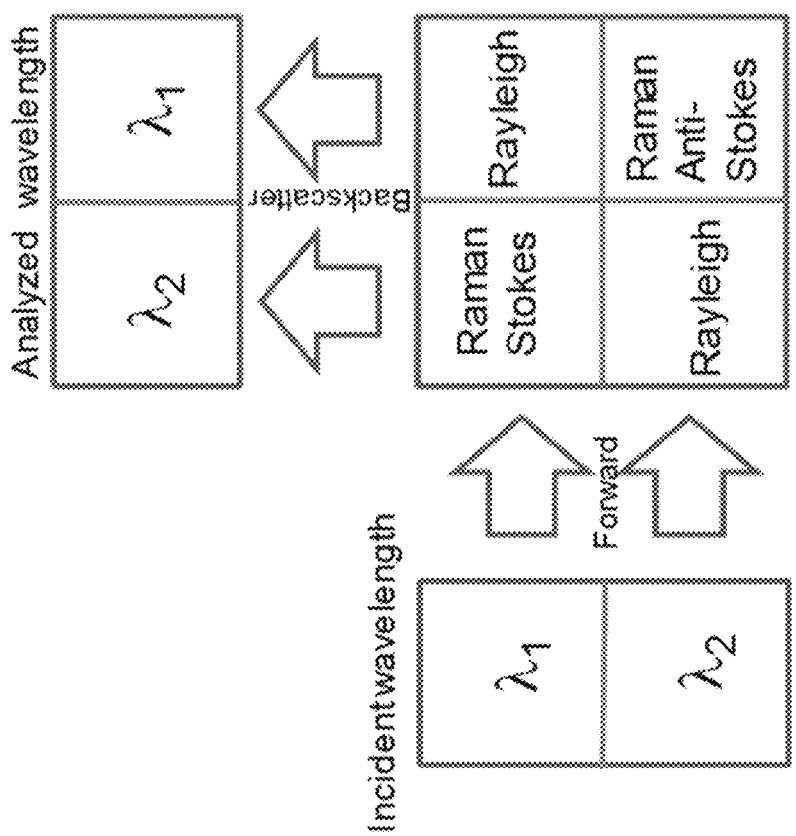
FIG. 9 illustrates two by two measurements that may be combined using four combinations of two wavelengths and two optical filter configurations, either as incident wavelength or as analysis wavelength, according to an example of the present disclosure.
Figure 10:
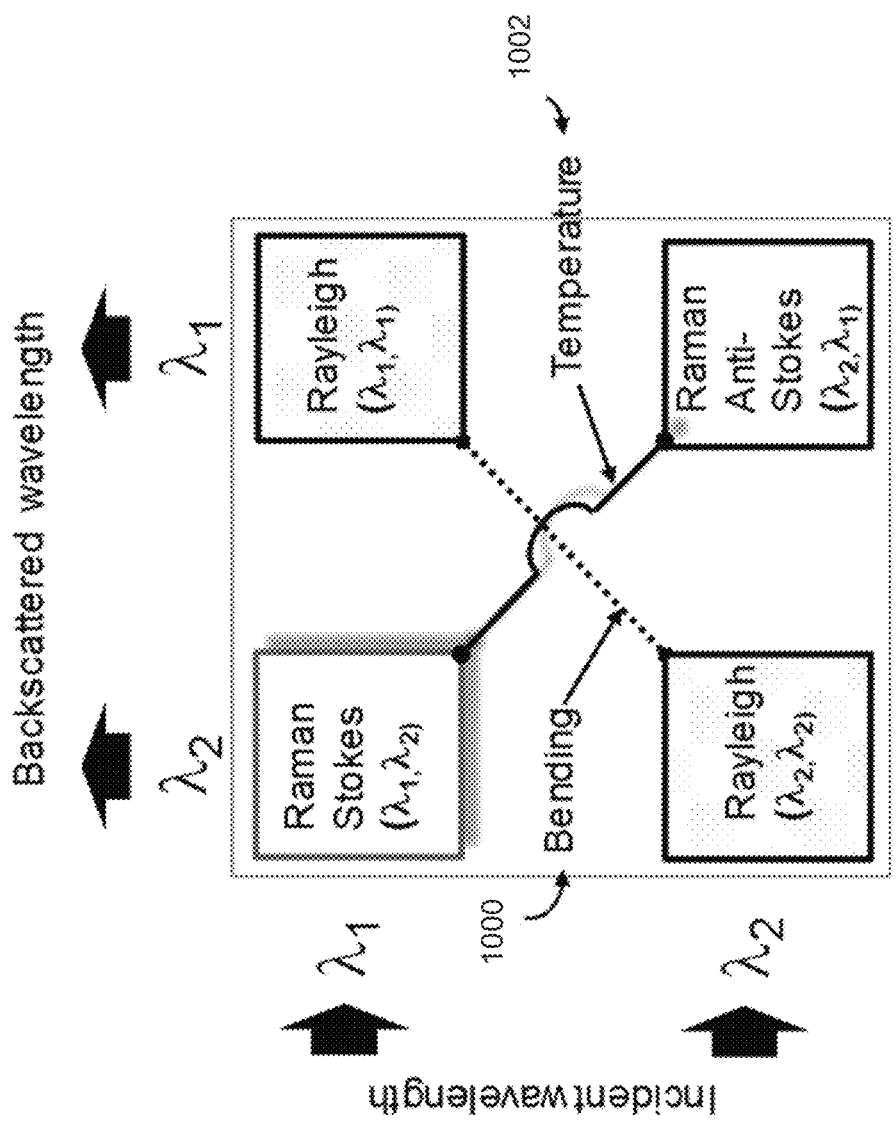
FIG. 10 illustrates utilization of all four of the combinations of FIG. 9 to determine the bending loss information from two Rayleigh traces, and temperature information, according to an example of the present disclosure.

Referring to FIG. 9, for the sensor 100, the four measurements may be combined using the four combinations of a two by two matrix, two incident wavelengths and two wavelength bands on the receiver side, either as incident wavelength or as analysis wavelength. In this regard, referring to FIG. 10, the sensor 100 may utilize all four of these combinations to determine the bending loss information at 1000 from the two Rayleigh traces analyzing the return signal at the same wavelength of the incident signal, and the temperature information at 1002 analyzing the return signal at the other wavelength. Further, as shown in FIG. 10, when source $\lambda 1$ is selected, the $\lambda 1$ band receiver may detect the Rayleigh signal when the $\lambda 2$ band receiver detects the Stokes signal. Symmetrically, when source $\lambda 2$ is selected, the $\lambda 2$ band receiver may detect the Rayleigh signal when the $\lambda 1$ band receiver detects the Anti-Stokes signal.

Figure 11:
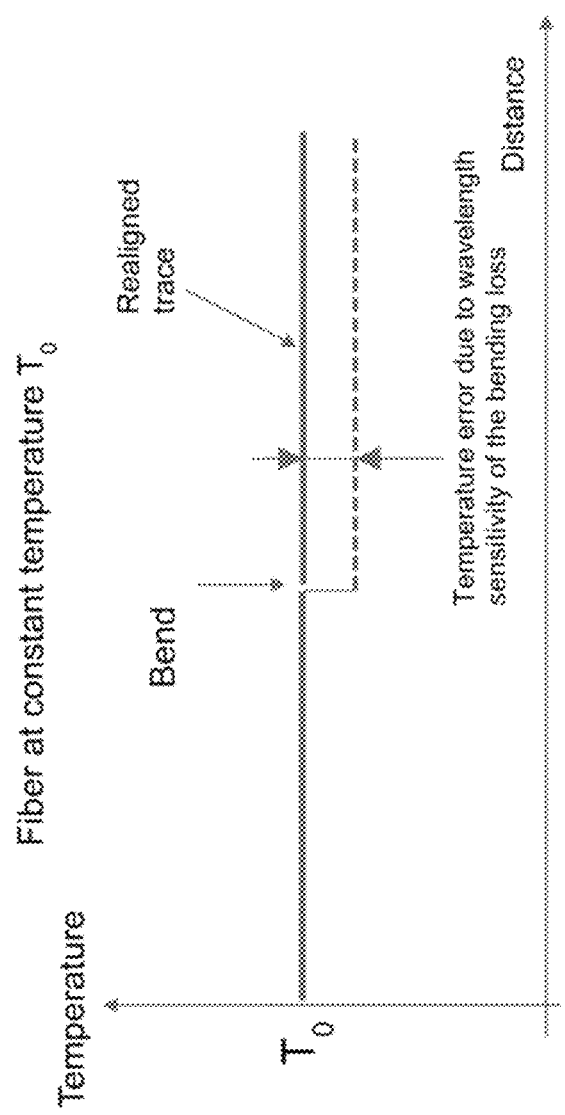
FIG. 11 illustrates re-alignment of a trace to compensate for a wavelength sensitive loss-event, according to an example of the present disclosure.

FIG. 11 illustrates re-alignment of a trace to compensate for a wavelength sensitive loss-event.

As disclosed herein, with respect to the temperature distribution sensor 100, the wavelength sensitive loss of a local event may be compensated by applying locally a specific differential attenuation correction. Further, with respect to the temperature distribution sensor 100, the wavelength sensitive loss of the local event may be due to the physical degradation of the fiber or fiber cable integrity. In this regard, as shown in FIG. 11, an associated trace may be re-aligned with respect to the wavelength sensitive loss-event (e.g., a bend) to compensate for the wavelength sensitive loss-event.

Figure 12:
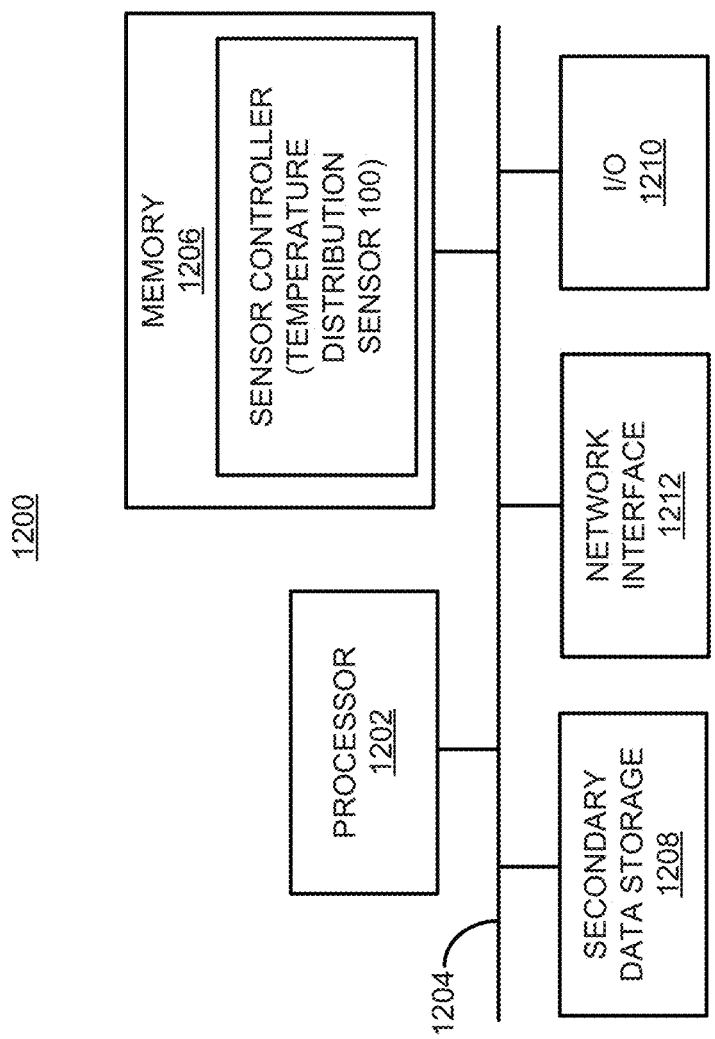
FIG. 12 illustrates a computer system, according to an example of the present disclosure.

FIG. 12 shows a computer system 1200 that may be used with the examples described herein. The computer system may represent a generic platform that includes components that may be in a server or another computer system. The computer system 1200 may be used as part of a platform for a sensor controller for the sensor 100 of FIG. 1. The computer system 1200 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 1200 may include a processor 1202 that may implement or execute machine readable instructions performing some or all of the methods, functions and other processes described herein. Commands and data from the processor 1202 may be communicated over a communication bus 1204. The computer system may also include a main memory 1206, such as a random access memory (RAM), where the machine readable instructions and data for the processor 1202 may reside during runtime, and a secondary data storage 1208, which may be non-volatile and stores machine readable instructions and data. The memory and data storage are examples of computer readable mediums. The memory 1206 may include a sensor controller for the sensor 100 of FIG. 1 including machine readable instructions residing in the memory 1206 during runtime and executed by the processor 1202.

The computer system 1200 may include an I/O device 1210, such as a keyboard, a mouse, a display, etc. The computer system may include a network interface 1212 for connecting to a network. Other known electronic components may be added or substituted in the computer system.

The processor 1202 may be designated as a hardware processor. The processor 1202 may execute operations associated with various components of the sensor 100. For example, the processor 1202 may execute operations associated with the sensor controller for the sensor 100 of FIG. 1, etc.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A temperature distribution sensor comprising:
   a first laser source to emit a first laser beam at a first wavelength for injection into a device under test (DUT);
   a second laser source to emit a second laser beam at a second wavelength for injection into the DUT, wherein the second wavelength is separated from the first wavelength by a fiber Raman shift;

a first wavelength optical receiver to convert a return signal at the first wavelength with respect to a Rayleigh backscatter signal at the first wavelength and a Raman backscatter Stokes signal at the second wavelength;

a second wavelength optical receiver to convert a return signal at the second wavelength with respect to a Rayleigh backscatter signal at the second wavelength and a Raman backscatter Anti-Stokes signal at the first wavelength;

a processor; and a memory storing machine readable instructions that when executed by the processor cause the processor to:
determine a distributed temperature associated with the DUT by utilizing the Raman backscatter Anti-Stokes signal at the first wavelength and the Raman backscatter Stokes signal at the second wavelength.

2. The temperature distribution sensor according to claim 1, wherein the machine readable instructions, when executed by the processor, further cause the processor to:
determine a bending loss associated with the DUT by utilizing the Rayleigh backscatter signal at the first wavelength and the Rayleigh backscatter signal at the second wavelength.

3. The temperature distribution sensor according to claim 1, wherein the machine readable instructions, when executed by the processor, further cause the processor to:
identify, by combining measurements associated with the Rayleigh backscatter signal and the Raman backscatter Anti-Stokes signal at the first wavelength, and the Rayleigh backscatter signal and the Raman backscatter Stokes signal at the second wavelength, a false temperature offset related to an attribute of the DUT.

4. The temperature distribution sensor according to claim 3, wherein the attribute of the DUT includes a bending loss associated with the DUT.

5. The temperature distribution sensor according to claim 1, wherein the DUT includes an optical fiber.

6. A method for sensing a temperature distribution associated with a device under test (DUT), the method comprising:

emitting, from a first laser source, a first laser beam at a first wavelength for injection into the DUT;

emitting, from a second laser source, a second laser beam at a second wavelength for injection into the DUT, wherein the second wavelength is separated from the first wavelength by a fiber Raman shift;

converting, by a first wavelength optical receiver, a return signal corresponding to the first wavelength with respect to a Rayleigh backscatter signal at the first wavelength and a Raman backscatter Stokes signal at the second wavelength;

converting, by a second wavelength optical receiver, the return signal corresponding to the second wavelength with respect to a Rayleigh backscatter signal at the second wavelength and a Raman backscatter Anti-Stokes signal at the first wavelength; and determining, by a processor, the temperature distribution associated with the DUT by utilizing the Raman backscatter Anti-Stokes signal at the first wavelength and the Raman backscatter Stokes signal at the second wavelength.

7. The method according to claim 6, further comprising:
determining, by the processor, a bending loss associated with the DUT by utilizing the Rayleigh backscatter signal at the first wavelength and the Rayleigh backscatter signal at the second wavelength.

8. The method according to claim 6, further comprising:
identifying, by the processor, a false temperature offset related to an attribute of the DUT by combining measurements associated with the Rayleigh backscatter signal and the Raman backscatter Anti-Stokes signal at the first wavelength, and the Rayleigh backscatter signal and the Raman backscatter Stokes signal at the second wavelength.

9. The method according to claim 8, wherein the attribute of the DUT includes a bending loss associated with the DUT.

10. The method according to claim 6, wherein the DUT includes an optical fiber.

* * * * *